United States Patent
Purdy

(10) Patent No.: US 7,715,941 B1
(45) Date of Patent: May 11, 2010

(54) METHOD AND APPARATUS FOR SCHEDULING A PLURALITY OF PROCESSING TOOLS

(75) Inventor: Matthew A. Purdy, Autin, TX (US)

(73) Assignee: Advanced Micro Devices, Austin, TX (US)

( * ) Notice: Subject to any disclaimer, the term of this patent is extended or adjusted under 35 U.S.C. 154(b) by 608 days.

(21) Appl. No.: 10/980,407

(22) Filed: Nov. 3, 2004

(51) Int. Cl.
*G06F 19/00* (2006.01)

(52) U.S. Cl. .................. 700/169; 700/99; 700/121; 700/179

(58) Field of Classification Search ........... 700/99–101, 700/169, 112, 121, 179, 95, 96
See application file for complete search history.

(56) References Cited

U.S. PATENT DOCUMENTS

| | | | | |
|---|---|---|---|---|
| 3,952,388 A | * | 4/1976 | Hasegawa et al. | 29/33 P |
| 5,544,350 A | * | 8/1996 | Hung et al. | 716/19 |
| 5,926,690 A | * | 7/1999 | Toprac et al. | 438/17 |
| 5,928,389 A | * | 7/1999 | Jevtic | 29/25.01 |
| 6,245,581 B1 | * | 6/2001 | Bonser et al. | 438/8 |
| 6,298,470 B1 | * | 10/2001 | Breiner et al. | 716/4 |
| 6,604,012 B1 | * | 8/2003 | Cho et al. | 700/121 |
| 2002/0173868 A1 | * | 11/2002 | Mukuta et al. | 700/100 |
| 2003/0153995 A1 | * | 8/2003 | Karasawa | 700/101 |
| 2003/0158618 A1 | * | 8/2003 | Browning | 700/99 |

* cited by examiner

*Primary Examiner*—Paul L Rodriguez
*Assistant Examiner*—Carlos Ortiz Rodriguez
(74) *Attorney, Agent, or Firm*—Williams, Morgan & Amerson

(57) ABSTRACT

The present invention provides a method and apparatus for scheduling a plurality of processing tools. The method comprises providing a first processing tool and a plurality of second processing tools, selecting one of the plurality of second processing tools, and determining a target output parameter of a combination of processing tools comprising said first processing tool and said selected one of the plurality of second processing tools. The method also includes determining at least one input parameter of a process model for controlling the first processing tool based upon the target output parameter of the combination of processing tools.

28 Claims, 3 Drawing Sheets

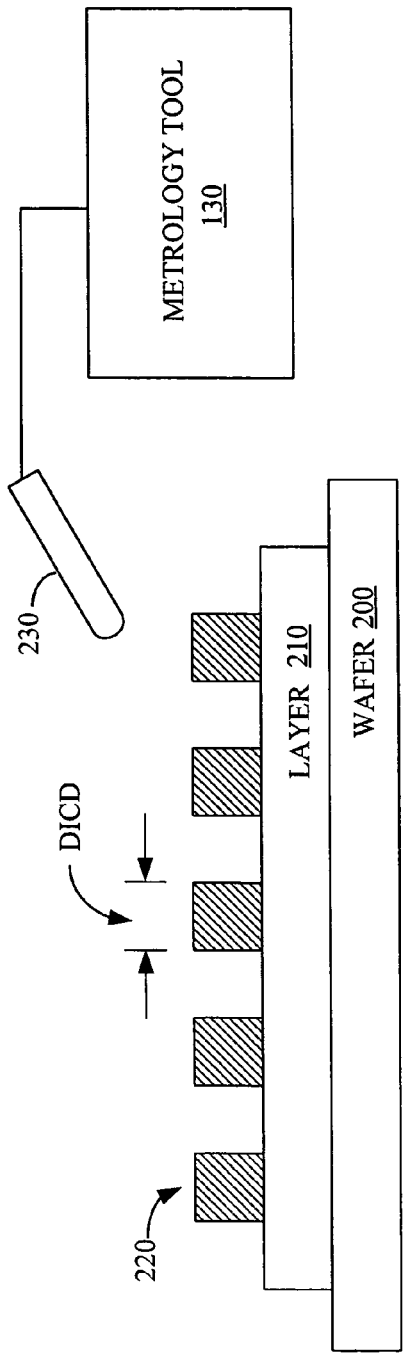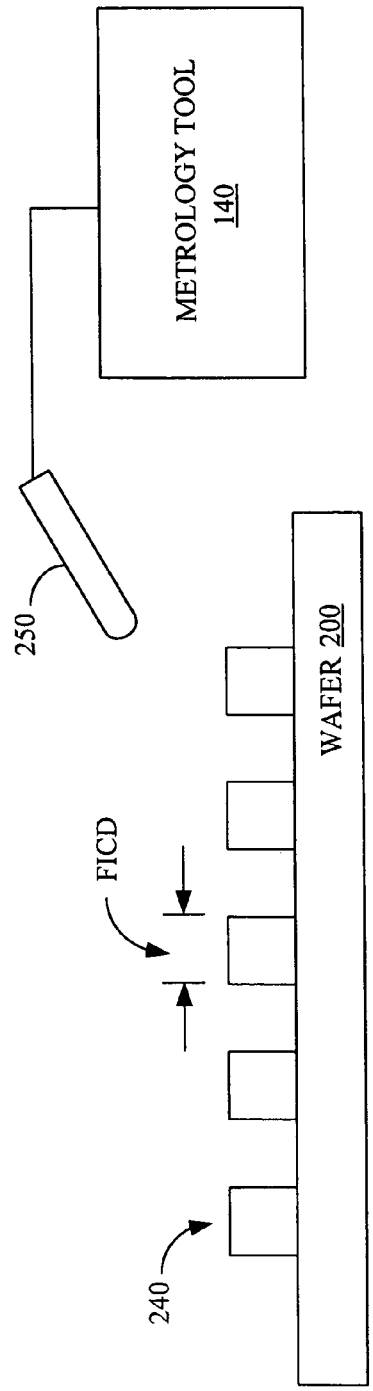

METHOD AND APPARATUS FOR SCHEDULING A PLURALITY OF PROCESSING TOOLS

BACKGROUND OF THE INVENTION

1. Field of the Invention

This invention relates generally to the field of semiconductor device manufacturing and, more particularly, to a method and apparatus for scheduling a plurality of processing tools.

2. Description of the Related Art

A variety of processing tools are used to fabricate a semiconductor device. The processing tools may include photolithography steppers, etch tools, deposition tools, polishing tools, rapid thermal processing tools, ion implantation tools, and the like. Wafers (or wafer lots) are processed in the tools in a predetermined order and each processing tool modifies the wafers according to a particular operating recipe. For example, a photolithography stepper may be used to form a patterned layer of photoresist (i.e. a mask) above a dielectric layer that has been deposited above the wafer. Features in the patterned layer of photoresist correspond to a plurality of features, e.g. gate electrode structures, which will ultimately be formed above the surface of the wafer. The wafer is then provided to an etch tool that etches away portions of the dielectric layer corresponding to features in the mask to form the plurality of features above the surface of the wafer.

The characteristics of the features formed above the surface of the wafer depend in part on the processing tools that participated in forming the feature. For example, the width of an etch line on a wafer is typically defined by both the etching and photolithography processes. For example, a layer of material may be deposited above a wafer. Then a patterned layer of photoresist (e.g. a mask layer) is formed above the layer of material by a photolithography tool. An etching process is then performed on the underlying layer of material through the patterned masking layer to define a plurality of features, e.g. lines, in the underlying layer of material. Thus, errors in either the photolithography process used to form the patterned masking layer or the etching process may lead to errors in the features formed in the underlying layer.

Feedback control may be provided to some of the processing tools to control the characteristics of the features formed above the surface of the wafer. For example, the exposure dose used by a photolithography stepper may be adjusted to control the width of printed resist lines formed in the mask layer. However, various practical considerations, including cost, complexity, and the like, usually limit the number of processing tools that can be placed under feedback control in conventional processing systems. Thus, conventional processing systems typically rely upon predetermined process models to account for the characteristics of features formed by the processing tools. For example, a process model may be used to relate a development inspection critical dimension (DICD) of a feature in a mask layer to a final inspection critical dimension (FICD) of the corresponding feature when formed above the wafer, i.e. after the etching process is complete. Thus, the exposure dose used in the photolithography step may be selected so that, on average, the final inspection critical dimension (FICD) of etched lines formed above the wafers in a wafer lot processed by the photolithography stepper and the etching tool will be near a target value for the final inspection critical dimension (FICD) of such a feature.

In some process flow arrangements, a single tool may be used to supply wafers to a selected one of a plurality of other processing tools. For example, a photolithography stepper can form a mask layer over a wafer in approximately one minute, whereas an etching tool may take three to four minutes to etch the wafer. Thus, at least in part to maintain a desired wafer throughput, conventional etch process flows may include, for example, two or three photolithography stepper tools that provide masked wafers to six or seven etching tools. Such conventional processing systems typically rely upon a single process model to account for the characteristics of features formed by the processing tools. For example, a single process model may be used to relate development inspection critical dimensions (DICD) of features in patterned masking layers formed by the aforementioned two or three photolithography stepper tools to final inspection critical dimensions (FICD) of corresponding features formed by the aforementioned six or seven etching tools.

However, a single process model may not be sufficient to characterize features that are formed in process flows that lack a one-to-one correspondence between the processing tools in the process flow. For example, each photolithography stepper may form a mask layer having a different development inspection critical dimension (DICD). Moreover, each etch tool in the process flow may have a different etch bias so that the relationship between the development inspection critical dimension (DICD) and the final inspection critical dimension (FICD) may vary depending on the etching tool used to form the feature. Thus, the actual final inspection critical dimension (FICD) of features formed on the wafer may differ from the value predicted by the process model and may also vary depending upon the particular combination of photolithography stepper and/or etching tool used to form the mask layer and/or feature. Consequently, attempting to control the final inspection critical dimension (FICD) of features etched by the different etch tools by controlling the exposure dose in the photolithography stepper based upon a single process model for all combinations of the various processing tools may result in different feature size populations for each of the etching tools.

The present invention is directed to addressing the effects of one or more of the problems set forth above.

SUMMARY OF THE INVENTION

In one embodiment of the present invention, a method is provided for scheduling a plurality of processing tools. The method comprises providing a first processing tool and a plurality of second processing tools, selecting one of the plurality of second processing tools, and determining a target output parameter of a combination of processing tools comprising said first processing tool and said selected one of the plurality of second processing tools. The method also includes determining at least one input parameter of a process model for controlling the first processing tool based upon the target output parameter of the combination of processing tools. In other embodiments, apparatuses for implementing methods of scheduling a plurality of processing tools are provided.

BRIEF DESCRIPTION OF THE DRAWINGS

The invention may be understood by reference to the following description taken in conjunction with the accompanying drawings, in which like reference numerals identify like elements, and in which:

FIG. 2A conceptually illustrates a wafer that has been processed by a photolithography tool, in accordance with the present invention;

FIG. 2B conceptually illustrates a wafer that has been processed by a photolithography tool and one of a plurality of etch tools, in accordance with the present invention.

Figure 1:
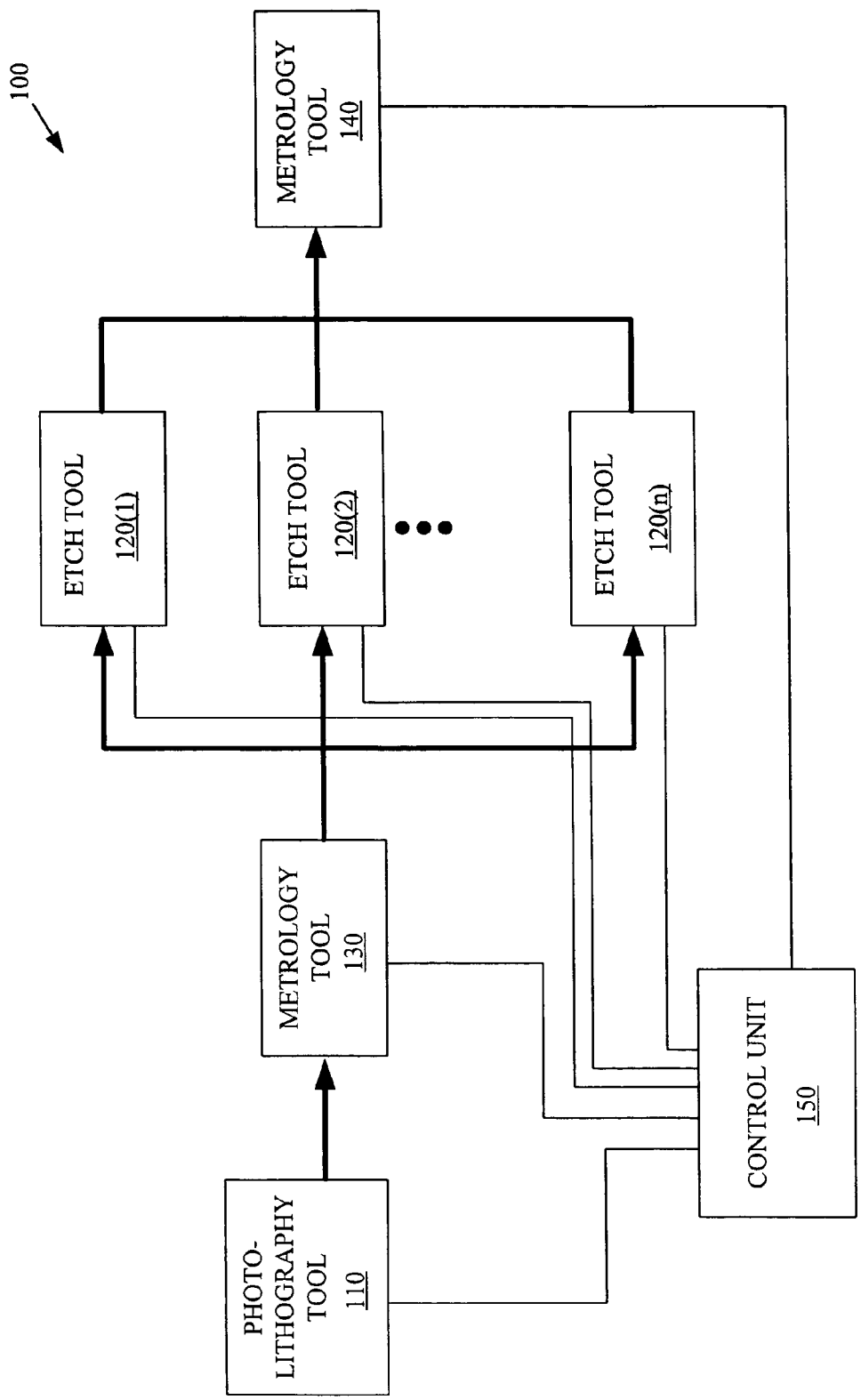
FIG. 1 conceptually illustrates an exemplary embodiment of a system for processing wafers, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates an exemplary embodiment of a system 100 for processing wafers. In the illustrated embodiment, the system 100 includes a photolithography tool 110 and a plurality of etch tools 120(1–n), as well as one or more metrology tools 130, 140. Although only one photolithography tool 110 is shown in FIG. 1, persons of ordinary skill in the art should appreciate that additional photolithography tools 110 may be included in the system 100. Moreover, although the present invention will be described in the context of an exemplary embodiment including one or more photolithography tools 110 and a plurality of etch tools 120(1–n), the present invention is not limited to photolithography tools 110 and/or etch tools 120(1–n). In alternative embodiments, any desirable combination of at least one first processing tool and a plurality of second processing tools may be used. For example, the first processing tool may be a deposition tool and the second processing tools may be polishing tools.

In a typical process flow, a workpiece including a wafer (or a wafer lot) is provided to the photolithography tool 110, which forms a mask layer above the wafer or above any layers that have been previously formed on the wafer. The workpiece may then be provided to the metrology tool 130. In one embodiment, the metrology tool 130 measures various parameters associated with the mask layer, such as a development inspection critical dimension (DICD) of various features formed in the patterned mask layer. The workpiece is provided to a selected one of the etch tools 120(1–n), which may etch one or more layers underlying the mask layer.

The workpiece may then be provided to the metrology tool 140. In one embodiment, the metrology tool 140 measures various parameters associated with the features formed in the wafer and/or in the layers formed on the wafer as a result of the etching process, such as a final inspection critical dimension (FICD). In the illustrated embodiment, the metrology tools 130, 140 are separate entities. However, the present invention is not limited to separate metrology tools 130, 140. In one alternative embodiment, the metrology tools 130, 140 may be the same metrology tool. Furthermore, the metrology tools 130, 140 may be integrated metrology tools, standalone metrology tools, or any other desirable type of metrology tool.

FIG. 2A conceptually illustrates a wafer 200 that has been processed by a photolithography tool, such as the photolithography tool 110 shown in FIG. 1. A layer 210 has been formed over the wafer 200 and a patterned mask layer 220 has been formed over layer 210. As shown in FIG. 2A, the features in the patterned mask layer 220 have a development inspection critical dimension (DICD) that may be measured by the metrology tool 130. In the illustrated embodiment, the metrology tool 130 includes a detector 230, such as a light detector that may be used in a scatterometer. However, persons of ordinary skill in the art should appreciate that the present invention is not limited to metrology tools 130 that include a scatterometer and/or a light detector 230. In alternative embodiments, any desirable type of metrology tool 130 and/or detector 230 may be used.

The metrology tool 130 may measure development inspection critical dimensions (DICD) of individual features and/or a selected plurality of features in the patterned mask layer 220. The metrology tool 130 may also determine one or more values indicative of the development inspection critical dimensions (DICD) of features in the patterned mask layer 220, such as an average value of the development inspection critical dimension (DICD) of a plurality of features, a median value of the development inspection critical dimension (DICD) of the plurality of features, or any other desirable statistical combination of the development inspection critical dimensions (DICD) of the plurality of features in the patterned mask layer 220.

FIG. 2B conceptually illustrates the wafer 200 after it has been processed by a photolithography tool and one of a plurality of etch tools, such as the etch tools 120(1-n) shown in FIG. 1. In the illustrated embodiment, the layer 210 has been etched to form a patterned layer 240 including a plurality of features corresponding to the features in the patterned mask layer 220. The patterned mask layer 220 has been removed from the wafer 200. For example, the patterned mask layer 220 may be removed using an ashing process or a wet chemical bath. As shown in FIG. 2B, the features in the patterned layer 240 have a final inspection critical dimension (FICD) that may be measured by the metrology tool 140, which includes a detector 250, such as the light detector that may be used in a scatterometer. However, persons of ordinary skill in the art should appreciate that the present invention is not limited to metrology tools 130 that include a scatterometer and/or a light detector 250. In alternative embodiments, any desirable type of metrology tool 140 and/or detector 250 may be used. Moreover, as discussed above, the metrology tools 130, 140 may be distinct tools or they may be the same tool.

The metrology tool 140 may measure final inspection critical dimensions (FICD) of individual features and/or a selected plurality of features in the patterned layer 240. The metrology tool 140 may also determine one or more values indicative of the final inspection critical dimensions (FICD) of features in the patterned layer 240, such as an average value of the final inspection critical dimension (FICD) of a plurality of features, a median value of the final inspection critical dimension (FICD) of the plurality of features, or any other desirable statistical combination of the final inspection critical dimensions (FICD) of the plurality of features in the patterned layer 240.

Referring back to FIG. 1, the system 100 includes a control unit 150 that is communicatively coupled to the photolithography tool 110, the etch tools 120(1-n), and the metrology tools 130, 140. In various alternative embodiments, the control unit 150 may be implemented in any desirable combination of hardware and/or software. The control unit 150 may also be part of an overall computer system that controls operations in the factory including the system 100, such as an Advanced Process Control system. As will be discussed in detail below, the control unit 150 is configured to determine one or more input parameters for a process model that is used by the photolithography tool 110. For example, the control unit 150 may determine an exposure dose and/or time for the photolithography tool 110, or a thickness of a layer of photoresist formed above the wafer. The control unit 150 may also determine the input parameters using the selected one of the etch tools 120(1-n) and a target output parameter of the processing flow described above. For example, the control unit 150 may determine the exposure dose and/or time for the photolithography tool 110 based on a target value of the development inspection critical dimension (DICD) and/or the final inspection critical dimension (FICD) of one or more features formed using the photolithography tool 110 and the selected etch tool 120(1).

Figure 3:
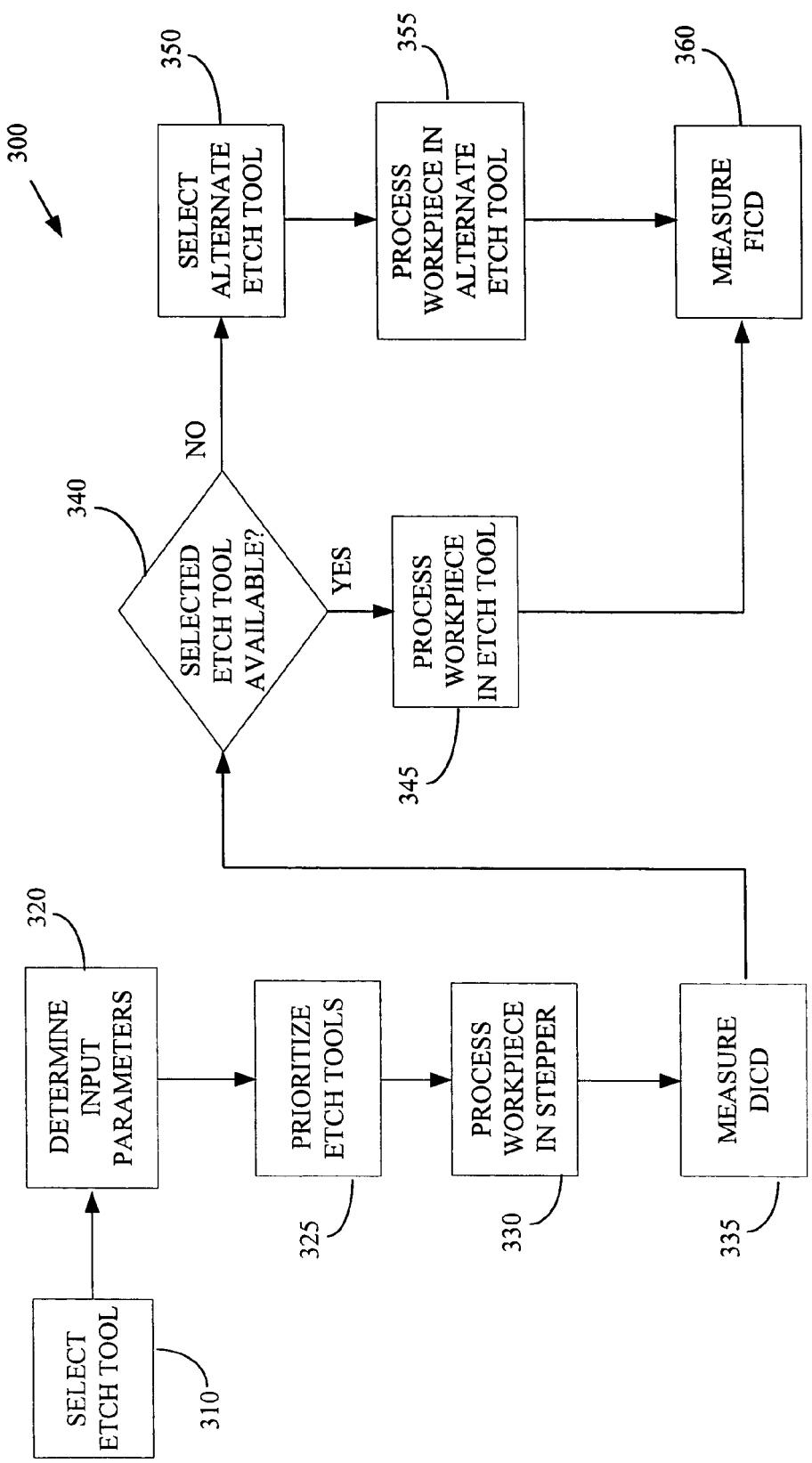
FIG. 3 conceptually illustrates a method of processing a wafer, in accordance with the present invention.

FIG. 3 conceptually illustrates, in flowchart form, an exemplary embodiment of a method 300 of processing a workpiece that may be implemented in the system 100 shown in FIG. 1. In various alternative embodiments, the workpiece may include a wafer, a wafer lot or batch, and the like. An etch tool, such as one of the etch tools 120 shown in FIG. 1, is selected (at 310) from a plurality of etch tools. In various alternative embodiments, the etch tool may be selected based upon any desirable criteria. For example, the etch tool may be selected based upon a manufacturing state of a factory that houses the plurality of etch tools. The selection criteria may include a work-in-progress distribution, availability of the etch tools or a photolithography tool, a state of one or more processes currently running on the etch tools and/or the photolithography tool, one or more queues associated with the etch tools and/or the photolithography tool, and the like.

A control unit, such as the control unit 150 shown in FIG. 1, determines (at 320) one or more input parameters for a model of a process flow that may be used to process the workpiece. Exemplary input parameters may include exposure times, exposure doses, etching times, and the like. In one embodiment, the model of the process flow includes linear control equations of the general form y=mx+b, where y is the model output parameter, m is a slope, x is an input parameter, and b is a constant determined for the particular model. However, persons of ordinary skill in the art should appreciate that the control equations may take on any desirable functional form. For example, the control equation may be a quadratic equation or other higher or lower order equation.

In one embodiment, a model of a process flow including a photolithography stepper and an etch tool may include a linear control equation:

$$DICD = At + B_{stp}$$

In this equation, the model of the process flow determines the development inspection critical dimension (DICD) of features in a masking layer formed by the photolithography stepper to a photolithography parameter (A) and a model constant (sometimes called a controller parameter or a controller state) specific to the photolithography tool ($B_{stp}$). These quantities may be determined in any desirable manner including, but not limited to, using historical data associated with the photolithography stepper. The input parameter for this equation may be an exposure time (t). For example, a photolithography stepper having a photolithography parameter A=50 angstroms/sec and a model constant $B_{stp}$=0.1 angstroms would produce, on average, a mask having a DICD=50.1 angstroms after an exposure time of t=1 second. Alternatively, the input parameter for this equation may be an exposure dose (t). For example, a photolithography stepper having a photolithography parameter A=50 angstroms/mJ and a model constant $B_{stp}$=0.1 angstroms would produce, on average, a mask having a DICD=50.1 angstroms after an exposure dose of t=1 milliJoule. Although the model constant $B_{stp}$, is positive in the above embodiment, the present invention is not limited to positive model states. In alternative embodiments, the model constant $B_{stp}$ may be negative or approximately zero.

The model of the process flow including the photolithography stepper and the etch tool may also include a second control equation:

$$FICD=DICD+Bias_{etch}$$

This control equation relates the development inspection critical dimension (DICD) of features in a masking layer formed by the photolithography stepper to the final inspection critical dimension (FICD) of features formed by etching one or more layers underneath the masking layer. The bias parameter ($Bias_{etch}$) is a constant that relates the development inspection critical dimension (DICD) to the final inspection critical dimension (FICD) for a specific combination of the photolithography tool and the selected etch tool. The bias parameter ($Bias_{etch}$) may be determined in any desirable manner including, but not limited to, using historical data associated with the etch tool. For example, an etch tool having a bias parameter $Bias_{etch}$=0.5 angstroms would produce, on average, features having an FICD=50.6 angstroms from the mask having the DICD=50.1 angstroms. Although the bias parameter ($Bias_{etch}$) is positive in the above embodiment, the present invention is not limited to positive etch biases. In alternative embodiments, the bias parameter ($Bias_{etch}$) may be negative or approximately zero.

These control equations may be combined to yield an expression:

$$t=(FICD_{target}-B_{stp}+Bias_{etch})/A,$$

for the exposure of the photolithography tool (t) as a function of the target final inspection critical dimension, $FICD_{target}$. In this embodiment, the control unit 150 uses the above expression to determine (at 320) the exposure time (i.e. the input parameter) to be used by a photolithography tool to process the workpiece based on the target final inspection critical dimension, $FICD_{target}$. However, persons of ordinary skill in the art should appreciate that the present invention is not limited to determining (at 320) the exposure dose. In alternative embodiments, other models based on other control equations may be used to determine other input parameters, such as an exposure dose. In one embodiment, the control unit 150 may prioritize (at 325) one or more of the etch tools. As will be discussed below, one or more of the etch tools may be prioritized (at 325) in case the selected etch tool becomes unavailable sometime after the input parameters for the process model have been determined (at 320), but before the workpiece has been processed in the etch tool. In that eventuality, it may be desirable to select an alternate etch tool that has a bias ($Bias_{etch}$) that is relatively close to the bias ($Bias_{etch}$) of the selected etch tool to reduce any errors in the processed workpiece that may be caused by using the alternate etch tool. For example, four etch tools (A, B, C, and D) may have biases ($Bias_{etch}$) of 10, 13, 15, and 17, respectively. If a photolithography tool was masked for optimal performance on etch tool B, i.e. the etch tool having a bias of 13, the control unit and prioritize the etch tools in terms of their biases. Thus, the etch tools would be prioritized (at 225) in the order B, C, A, and D. Although the priorities in the above example are determined based on the absolute value of the difference in biases, the present invention is not so limited. In alternative embodiments, any desirable criterion may be used. For example, larger negative biases may, in some cases, be prioritized ahead of relatively smaller positive biases.

In one alternative embodiment, the control unit 150 may determine that processing the workpiece on one of the etch tools may result in an unacceptable product. For example, the process flow may have an allowable window for the etch bias of ±3. In that case, when the photolithography tool is masked for optimal performance on etch tool B, the control unit may determine that processing the workpiece on the etch tool D would provide an unacceptable product. The etch tools would then be prioritized (at 325) in the order B, C, and A, and the etch tool D would not be included on the priority list.

The workpiece is processed (at 330) in the photolithography tool according to the process model using the at least one determined input parameter, as discussed above. In one embodiment, a development inspection critical dimension (DICD) associated with the processed workpiece is measured (at 335). For example, a metrology tool may be used to measure (at 335) the development inspection critical dimension (DICD), as discussed above. However, measuring (at 335) the development inspection critical dimension (DICD) is an optional step that is not necessary for the practice of the present invention and may be omitted in some embodiments of the present invention.

In one embodiment, the control unit 150 then determines (at 340) whether or not the selected etch tool is available. For example, the selected etch tool may be taken off-line or otherwise become unavailable sometime after being selected but before being used to process the workpiece. If the selected etch tool is available, the workpiece is processed (at 345) in the selected etch tool, as discussed in detail above. If the selected etch tool is not available, an alternate etch tool may be selected (at 350). For example, the alternate etch tool may be selected (at 350) based on the priority list. The workpiece is then processed (at 355) in the alternate etch tool.

In one embodiment, a final inspection critical dimension (FICD) associated with the workpiece is measured (at 360). For example, a metrology tool may be used to measure (at 360) the final inspection critical dimension (FICD), as discussed above. However, persons of ordinary skill in the art should appreciate that measuring (at 360) the final inspection critical dimension (FICD) is an optional step that may be omitted in some alternative embodiments of the present invention. If the final inspection critical dimension (FICD) is measured (at 360), it may be provided to the control unit so that the control unit may modify one or more parameters of the process model based on the final inspection critical dimension (FICD).

In one other illustrative embodiment, the present invention is directed to a method that comprises providing a first processing tool and a plurality of second processing tools and selecting one of the plurality of second processing tools. For example, the first processing tool may be a photolithography tool, a deposition tool, and the like. The second processing tools may be etching tools, polishing tools, and the like. A target output parameter of a combination of processing tools comprising said first processing tool and said selected one of the plurality of second processing tools is then determined. The target output parameter of the combination of processing tools may then be used to determine one or more input parameters of a process model for controlling the first processing tool. For example, the target output parameter may include a target critical dimension, a target layer thickness, and the like.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of controlling operation of a plurality of processing tools used to form features on semiconductor workpieces, the processing tools comprising a first processing tool and a plurality of second processing tools that perform a different operation than the first processing tool, the first processing tool being configured to process semiconductor workpieces according to a first process model and provide the processed semiconductor workpiece to any one of the second processing tools for processing according to a corresponding one of a plurality of second processing models, each of the second processing models being defined by at least one parameter that is different for each of the second processing tools, the method comprising:

initially selecting, prior to processing at least one semiconductor workpiece in the first processing tool, one of the plurality of second processing tools for processing said at least one semiconductor workpiece after said at least one semiconductor workpiece has been processed in the first processing tool;

determining a target output parameter indicative of features to be formed by processing said at least one semiconductor workpiece with said first processing tool and said selected one of the plurality of second processing tools;

determining at least one input parameter of the first process model so that processing the semiconductor workpiece in the first processing tool and the selected second processing tool would result in features having the target output parameter;

determining, after processing the semiconductor workpiece in the first processing tool, that the selected second processing tool is unavailable for processing; and selecting an alternate second processing tool characterized by an alternate process model parameter that is within a tolerance of an initial process model parameter that characterized the initially selected second processing tool so that processing the semiconductor workpiece in the alternate second processing tool would result in features having the target output parameter.

2. The method of claim 1, wherein selecting one of the plurality of second processing tools comprises selecting one of the plurality of second processing tool based upon a manufacturing state of a factory comprising the plurality of second processing tools.

3. The method of claim 1, wherein selecting one of the plurality of the second processing tools comprises selecting one of the plurality of second processing tools based upon at least one of a work-in-progress distribution, availability of the first or second processing tools, at least one process currently running on the first or second processing tools, and at least one queue associated with the first or second processing tools.

4. The method of claim 1, further comprising processing said at least one workpiece in the first processing tool according to the first process model using the at least one determined input parameter.

5. The method of claim 1, further comprising processing the at least one workpiece in at least one of the second processing tools other than the initially selected second processing tool.

6. The method of claim 5, wherein processing the at least one workpiece in at least one of the second processing tools comprises processing the at least one workpiece in the alternate selected second processing tool.

7. The method of claim 5, further comprising determining a plurality of priorities associated with the plurality of second processing tools based upon the at least one determined input parameter and the second process model parameters that characterize each of the plurality of second processing tools.

8. The method of claim 7, further comprising:
  determining that the initially selected second processing tool is unavailable after determining said at least one input parameter;
  selecting the alternate second processing tool based upon the priorities associated with the second processing tools; and
  processing the at least one workpiece in the alternate second processing tool.

9. The method of claim 5, further comprising determining that at least one of the second processing tools should not be used to process the at least one workpiece based upon the at least one determined input parameter.

10. The method of claim 5, further comprising measuring at least one output parameter associated with said at least one workpiece processed in the first processing tool according to the first process model using said at least one determined input parameters and the alternate second processing tool.

11. The method of claim 9, further comprising modifying the at least one input parameter based upon the at least one measured output parameter.

12. The method of claim 1, wherein providing the first processing tool comprises providing a photolithography stepper and providing the plurality of second processing tools comprises providing a plurality of etch tools.

13. The method of claim 12, wherein determining the at least one input parameter of the first process model used by the first processing tool based upon the target output parameter comprises determining at least one of an exposure dose and an exposure time of a process model used by the photolithography stepper based upon the target output parameter.

14. The method of claim 1, wherein determining said at least one input parameter of the first process model comprises determining said at least one input parameter so that processing of the semiconductor workpiece by the first processing tool using said at least one input parameter to the first process model and processing of the semiconductor workpiece by the initially selected second processing tool using said at least one parameter of the second process model used for controlling the initially selected second processing tool would produce at least one feature on the semiconductor workpiece having said at least one target output parameter.

15. An apparatus for controlling operation of a plurality of processing tools used to form features on semiconductor workpieces, the processing tools comprising a first and a plurality of second processing tools that perform a different operation than the first processing tool, the first processing tool being configured to process semiconductor workpieces according to a first process model and provide the processed semiconductor workpiece to any one of the second processing tools for processing according to a corresponding one of a plurality of second processing models, each of the second processing models being defined by at least one parameter that is different for each of the second processing tools, the apparatus comprising:

means for initially selecting, prior to processing at least one semiconductor workpiece in the first processing tool, one of the plurality of second processing tools for processing said at least one semiconductor workpiece after said at least one semiconductor workpiece has been processed in the first processing tool;

means for determining a target output parameter indicative of features to be formed by processing said at least one semiconductor workpiece with said first processing tool and said selected one of the plurality of second processing tools; and means for determining at least one input parameter of the first process model so that processing the semiconductor workpiece in the first processing tool and the selected second processing tool would result in features having the target output parameter;

means for determining, after processing the semiconductor workpiece in the first processing tool, that the selected second processing tool is unavailable for processing; and means for selecting an alternate second processing tool characterized by an alternate process model parameter that is within a tolerance of an initial process model parameter that characterized the initially selected second processing tool so that processing the semiconductor workpiece in the alternate second processing tool would result in features having the target output parameter.

16. An apparatus, comprising:

a first processing tool for processing at least one semiconductor workpiece according to a first process model;

a plurality of second processing tools for processing the semiconductor workpiece according to a corresponding one of a plurality of second process models after processing by the first processing tool, each of the second processing models being defined by at least one parameter that is different for each of the second processing tools, and wherein the first processing tool is configured to provide the processed semiconductor workpiece to any one of the second processing tools; and a control unit for:

initially selecting, prior to processing said at least one semiconductor workpiece in the first processing tool, one of the plurality of second processing tools for processing said at least one semiconductor workpiece after said at least one semiconductor workpiece has been processed in the first processing tool;

determining a target output parameter indicative of features to be formed by processing said at least one semiconductor workpiece with said first processing tool and said selected one of the plurality of second processing tools;

determining at least one input parameter of the first process model so that processing the semiconductor workpiece in the first processing tool and the selected second processing tool would result in features having the target output parameter;

determining, after processing the semiconductor workpiece in the first processing tool, that the selected second processing tool is unavailable for processing; and selecting an alternate second processing tool characterized by an alternate process model parameter that is within a tolerance of an initial process model parameter that characterized the initially selected second processing tool so that processing the semiconductor workpiece in the alternate second processing tool would result in features having the target output parameter.

17. The apparatus of claim 16, wherein the control unit is configured to select one of the plurality of second processing tool based upon a manufacturing state of a factory comprising the plurality of second processing tools.

18. The apparatus of claim 16, wherein the control unit is configured to select one of the plurality of second processing tools based upon at least one of a work-in-progress distribution, availability of the first or second processing tools, at least one process currently running on the first or second processing tools, and at least one queue associated with the first or second processing tools.

19. The apparatus of claim 16, wherein the alternate selected second processing tool processes the at least one semiconductor workpiece.

20. The apparatus of claim 16, wherein the control unit is configured to determine a plurality of priorities associated with the plurality of second processing tools based upon the at least one determined input parameter and the second process model parameters that characterize each of the plurality of second processing tools.

21. The apparatus of claim 20, wherein the control unit is configured to:

determine that the initially selected second processing tool is unavailable after determining said at least one input parameter; and select the alternate second processing tool for processing the at least one semiconductor workpiece based upon the priorities of the second processing tools.

22. The apparatus of claim 16, wherein the control unit is configured to determine that at least one of the second processing tools should not be used to process the at least one semiconductor workpiece based upon the at least one determined input parameter.

23. The apparatus of claim 16, further comprising at least one metrology tool for measuring at least one output parameter associated with the semiconductor workpiece processed in the first processing tool according to the first process model using the determined input parameters.

24. The apparatus of claim 16, further comprising at least one metrology tool for measuring at least one output parameter associated with the semiconductor workpiece processed in the alternate second processing tool.

25. The apparatus of claim 24, wherein the control unit is configured to modify the at least one input parameter based upon the at least one measured output parameter associated with the semiconductor workpiece processed the alternate second processing tool.

26. The apparatus of claim 16, wherein the first processing tool is at least one of a photolithography tool and a deposition tool, and wherein the at least one input parameter is at least one of an exposure dose, an exposure time, and a deposition time.

27. The apparatus of claim 16, wherein the at least one second processing tool is at least one of an etch tool and a polishing tool.

28. The apparatus of claim 16, wherein the control unit is configured to determine said at least one input parameter so that processing of the semiconductor workpiece by the first processing tool using said at least one input parameter to the first process model and processing of the semiconductor workpiece by the initially selected second processing tool using said at least one parameter of the second process model used for controlling the initially selected second processing tool would produce at least one feature on the semiconductor workpiece having said at least one target output parameter.

* * * * *